UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

STABLE HYDROSULFITE PREPARATION AND PROCESS OF MAKING SAME.

No. 872,114.     Specification of Letters Patent.     Patented Nov. 26, 1907.

Application filed April 4, 1907. Serial No. 366,393.

*To all whom it may concern:*

Be it known that I, GADIENT ENGI, doctor of philosophy and chemist, a citizen of the Swiss Republic, and resident of Basel, Switzerland, have invented a new and useful Stable Hydrosulfite Preparation and a Process of Manufacturing the Same, of which the following is a full, clear, and exact specification.

Heretofore, so far as I am aware, it has been a matter of considerable difficulty to secure, by the employment of commercial hydrosulfite preparations, permanent variegated discharge effects upon those ground colors which are difficultly discharged, and such effects have only been practically attained when, according to the Jeanmaire and Zündel processes, certain materials such as anilin or phenol have been added to the discharge color (see *Zeitschrift für Farben- und Textil-Industrie* IV, 1905, pages 425, 426 and 428).

According to the present invention a new hydrosulfite preparation, which is capable of general application for the production of discharge effects, is produced by causing anhydroformaldehyde-anilin and formaldehyde to act in rapid succession on a concentrated aqueous solution of sodium hydrosulfite, whereby the sodium hydrosulfite is decomposed with formation of sodium phenylaminomethylsulfite  on the one hand, and sodium formaldehyde-sulfoxylate (OH.CH$_2$.O.SONa) on the other hand, while the formation of sodium phenylaminomethylsulfoxylate (C$_6$H$_5$NH CH$_2$.O.SONa), which is extremely unstable in the dry state (see *Berichte der Deutschen Chemischen Gesellschaft* 1905, 38, page 1076) is altogether avoided if the process be properly carried out.

The reaction may be illustrated by the following formula:

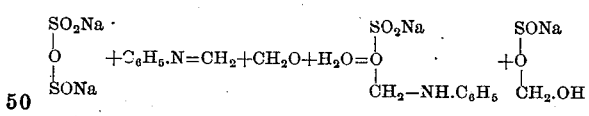

The solution obtained by the above reaction should be evaporated *in vacuo*, whereupon a colorless glassy mass is obtained which is stable in the air and consists in the main of the aforesaid products of reaction, with but a small proportion of sodium formaldehyde sulfite.

This new product is particularly well suited for use as a discharge, for the reason that the discharge mixtures prepared therewith, under ordinary conditions, and without the addition of other substances, yield better, purer and more complete variegated effects than are attainable by the employment of the various commercial hydrosulfite preparations even when the latter are employed with the addition of anilin or phenol.

In order that my improvements may be the better understood I will describe in detail the steps necessary for the production of the new hydrosulfite preparation where previously prepared anhydroformaldehyde-anilin is employed, and also where said compound is produced as a step of the process from anilin and formaldehyde.

Example I: 24 parts of freshly prepared, finely powdered anhydroformaldehyde-anilin are suspended in 200 parts of water and 52 parts of sodium hydrosulfite containing 75 per cent. of Na$_2$S$_2$O$_4$ are added in one lot, after which the mixture is well stirred for a short time in a closed vessel, whereupon a large part of the anhydroformaldehyde-anilin is dissolved. An aqueous solution of from 23 to 30 parts of formaldehyde of 30 per cent. strength is now rapidly introduced and the vessel is allowed to remain closed and is thoroughly shaken for some time, after which the solution is filtered to separate the undissolved anhydroformaldehyde and the filtrate is evaporated to dryness *in vacuo*. The product thus obtained, when employed in the proportion of from 280 to 300 grams per liter of discharge color, yields a complete and pure white discharge even on paranitranilin red, and in the proportion of from 220 to 250 grams per liter yields permanent variegated discharge effects even on such ground colors as are only discharged with difficulty by preparations heretofore employed.

Example II: 21 parts of anilin are mixed with 25 parts of aqueous formaldehyde of 30 per cent., strength, and the mixture is well shaken until it has become heated, whereupon a thick oil separates. 240 parts of water and 55 parts of sodium hydrosulfite of 73 per cent. strength are then added, the closed vessel is thoroughly shaken for some minutes, and 38 parts of a solution of formaldehyde of 30 per cent. strength are added. After long stirring, the unattacked anhydroformaldehyde-anilin is filtered off and the solution is evaporated *in vacuo*.

Having thus described my invention, what I claim and desire to secure by Letters Patent is:

1. The herein described process of manufacturing a stable hydrosulfite preparation suitable for the production of discharge effects upon ground colors which consists in causing an-hydroformaldehyde-anilin and an aqueous solution of formaldehyde to act in rapid succession upon an aqueous solution of sodium hydrosulfite and in transforming the product of reaction thus obtained to a solid state by evaporation *in vacuo*.

2. As a new article of manufacture, the herein described stable hydrosulfite preparation suitable for the production of discharge effects upon ground colors and consisting mainly of a mixture of sodium phenylaminomethylsulfite and of sodium formaldehydesulfoxylate, the said hydrosulfite preparation being a glassy mass, stable in the air.

In witness whereof I have hereunto signed my name this 23d day of March, 1907, in the presence of two subscribing witnesses.

GADIENT ENGI.

Witnesses:
 GEO. GIFFORD,
 AMAND BRAUN.